(12) United States Patent
Ehreke et al.

(10) Patent No.: US 8,027,238 B2
(45) Date of Patent: Sep. 27, 2011

(54) HOLOGRAPHIC DATA SUPPORT AND METHOD FOR PRODUCTION THEREOF

(75) Inventors: Jens Ehreke, Berlin (DE); Michael Knebel, Berlin (DE); Tomas Loeer, Berlin (DE); Oliver Muth, Berlin (DE); Rainer Seidel, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 1091 days.

(21) Appl. No.: 10/598,974

(22) PCT Filed: Mar. 7, 2005

(86) PCT No.: PCT/EP2005/051013
§ 371 (c)(1), (2), (4) Date: Jun. 11, 2007

(87) PCT Pub. No.: WO2005/091085
PCT Pub. Date: Sep. 29, 2005

(65) Prior Publication Data
US 2007/0297211 A1 Dec. 27, 2007

(30) Foreign Application Priority Data
Mar. 15, 2004 (DE) .......... 10 2004 012 787

(51) Int. Cl.
*G11B 7/00* (2006.01)
*G11C 13/04* (2006.01)
(52) U.S. Cl. .......... 369/103; 369/284; 359/572
(58) Field of Classification Search .......... 369/103, 369/286, 284; 359/35, 2, 572, 12, 576; 235/491
See application file for complete search history.

(56) References Cited

U.S. PATENT DOCUMENTS

| 4,458,345 | A   | * | 7/1984  | Bjorklund et al. ........... 369/103 |
| 5,101,184 | A   |   | 3/1992  | Antes et al.                        |
| 6,005,691 | A   | * | 12/1999 | Grot et al. .................. 359/2 |
| 6,476,942 | B1  |   | 11/2002 | Kodama et al.                       |
| 6,556,531 | B1  | * | 4/2003  | Yagi et al. ................... 369/103 |
| 6,695,213 | B2  | * | 2/2004  | Curtis ........................ 235/491 |
| 6,721,076 | B2  | * | 4/2004  | King et al. .................. 359/35 |
| 6,998,196 | B2  | * | 2/2006  | Rich et al. ................... 359/12 |
| 2005/0175815 | A1 |   | 8/2005  | Wild et al.                         |

FOREIGN PATENT DOCUMENTS

| CA | 2 046 711 | 1/1992 |
| CA | 2 179 566 | 2/1997 |

(Continued)

OTHER PUBLICATIONS

Japanese Patent Abstract, published Sep. 7, 1999 under publication No. 11240280.

(Continued)

*Primary Examiner* — Hoa T Nguyen
*Assistant Examiner* — Kim-Kwok Chu
(74) *Attorney, Agent, or Firm* — Michael J. Striker

(57) ABSTRACT

The invention relates to a data support (1) with a core layer (15) and at least one adjacent layer (14a), laminated to the core layer and a corresponding production method, said core layer being embodied from a holographic data store in the form of a volume hologram (5). The surface (141) facing the core layer, on the layer directly adjacent to the core layer, has a roughness (19), before lamination to the core layer, which affects the wavelength shift of the image reconstructed by the volume hologram.

22 Claims, 3 Drawing Sheets

FOREIGN PATENT DOCUMENTS

Figure 1:
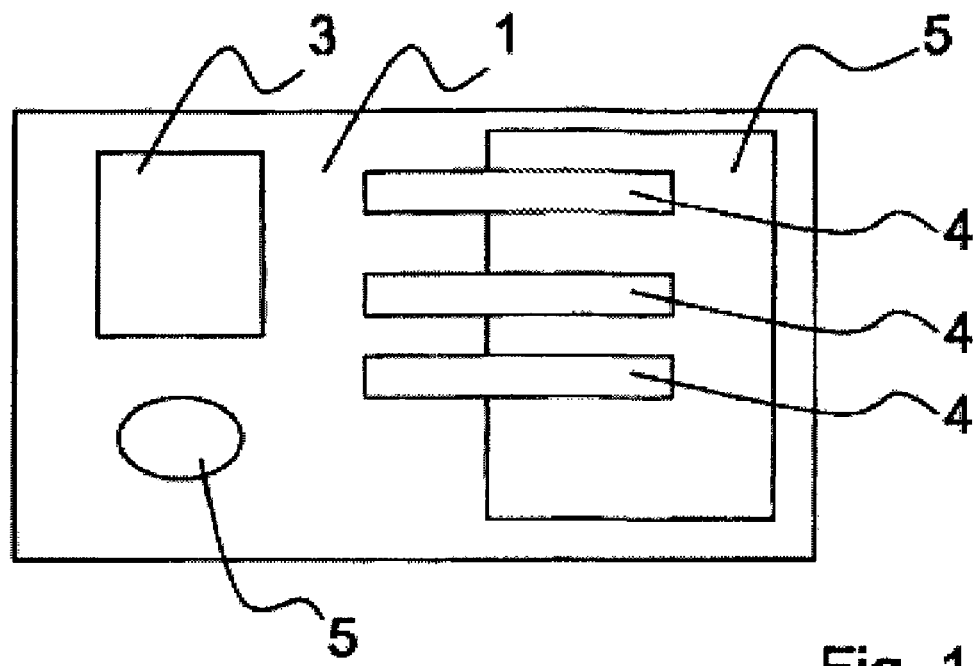

| | | |
|---|---|---|
| DE | 40 21 908 | 1/1992 |
| DE | 692 01 698 | 11/1995 |
| DE | 19809503 A1 | 2/1999 |
| DE | 38 56 284 | 6/1999 |
| DE | 102 32 245 | 2/2004 |
| EP | 0 291 928 | 11/1988 |
| EP | 0 529 459 | 3/1995 |
| EP | 0 762 238 | 3/1997 |
| EP | 0 919 961 | 6/1999 |
| EP | 1 387 215 | 2/2004 |
| WO | WO-01/53113 | 7/2001 |

OTHER PUBLICATIONS

Japanese Patent Abstract, published Nov. 7, 2003 under publication No. 2003316240.

* cited by examiner

HOLOGRAPHIC DATA SUPPORT AND METHOD FOR PRODUCTION THEREOF

CROSS-REFERENCE TO PRIOR APPLICATION

This is a U.S National Phase application under U.S.C. §371 of International Application No. PCT/EP05/051013, filed Mar. 7, 2005, and claims the benefit of German Patent Application No. 10 2004 012 787.5, filed Mar. 15, 2004, both of which are incorporated herein. The International Application was published in German on Sep. 29, 2005 as WO/2005/091085 A1 under PCT Article 21(2).

The invention relates to a data carrier with a core layer and at least one adjacent layer, which is laminated to the core layer, wherein the core layer consists of a holographic data memory in the form of a volume hologram. Furthermore, the invention relates to a procedure to manufacture a data carrier with a core layer and at least one layer adjacent to the core layer, wherein the core layer consists of a holographic data carrier in the form of a volume hologram, wherein at least one layer, which is adjacent to the core layer, is laminated to the core layer.

Chip cards, smart cards, personal documents, identification cards, driver's licenses, checks, tickets as well as other valuable and security documents and carriers of data are regarded as data carriers in the present invention.

A data carrier and a procedure for the manufacturing of such a data carrier according to the stated type is described in print DE 38 56 284 T2. A volume hologram element is laminated in detachable form to a substrate in order to be transferred to a value document.

In the case of a volume hologram or volume-type phase hologram, areas with a different refraction index are inserted in the volume of a light-sensitive type of material through coherent radiation of a certain wavelength. These areas are also called planes of Bragg. A three-dimensional image is reconstructed following the completion of the volume hologram by radiating the volume hologram with white light by means of refraction at the planes of Bragg and interference in the reflected light. The reflected light emerges thereby only for the wavelength and angle in which the original radiation took place.

Application DE 40 21 908 C2 discloses a data carrier comprised of a volume hologram that is covered with a transparent and thin protective foil made out of polycarbonate (PC) or other materials.

A data carrier with a volume hologram is also described in patent application EP 0 919 961 B1. The hologram is applied to a substrate and includes a change of the planes of Bragg as a result of local shrinking and/or swelling.

Patent application DE 69 201 698 T2 describes a procedure for the manufacturing of a multi-colored volume-type phase hologram, wherein a light-sensitive film element is radiated with coherent light at first in order to map a volume hologram in the film element. Subsequently, the film element is brought into contact with a diffusion element comprising a monomer, wherein the monomer diffuses in the film element following the contact. The wavelength of the image, which was reflected by the hologram, is increased as a result of the diffusion of the monomer in the film element. Consequently, the holographic image appears to have shifted towards the red color. The wavelength shift is fixed through polymerization of the monomer after the diffusion and locally controlled by polymerization that was implemented prior to the diffusion, respectively. This means that, in areas in which polymerization took place before the diffusion, the polymerization cannot be implemented and there will be no wavelength shift as a result thereof. There is a possibility of multi-colored images because of this. This procedure for the purpose of the wavelength shift is complex and has the disadvantage that an additional substance, which can possibly interfere, is used, which can negatively influence the characteristics of data carriers.

The invention is based on the task of creating a data carrier of the specified nature, wherein the protection of forgery against data carriers with a simple volume hologram has been increased and the possibility of a subsequent individualization is given. Furthermore, appealing solutions should be found in the design. Additionally, the task consisted of specifying a simple manufacturing process for such a data carrier which neither requires a lot of material, nor is costly.

According to the invention, the task is solved by the fact that the layer directly adjacent to the core layer includes a roughness before lamination to the surface facing the core layer. This roughness causes a wavelength shift of the image that is reconstructed by the volume hologram. The task is also solved by a procedure according to the invention for the manufacturing of such a type of data carrier, wherein the layer directly adjacent to the core layer is prepared with a surface facing the core layer, for lamination purposes, having a roughness that causes a wavelength shift of the image which is reconstructed by the volume hologram.

The data carrier according to the invention provides a higher level of forgery protection in appealing design possibilities. The procedure according to the invention is neither costly nor does it require a lot of material and can be realized with the conventional manufacturing processes. The volume hologram, which is readily exposed and mass produced, can be purposefully and subsequently individualized by introducing selective variations of roughness. Furthermore, the data carrier according to the invention shows the advantage that the layer directly placed over the core layer adheres very well to the core layer and is, consequently, very hard to peel off in the case of an attempted forgery. If a forgery is attempted, the volume hologram would be destroyed. With regard to the wavelength of the coherent light, with which the volume hologram was created, the volume hologram of the data carrier according to the invention shows a blue shift, i.e. a shift towards smaller wavelengths, which can be purposefully controlled by the magnitude of the roughness of the adjacent layer. As a result, a forger is given a hard time to reproduce the volume hologram since coherent light in multiple wavelengths is necessary and the continuous trends of the wavelength shift are hard to imitate for the purpose of a copy test. A forged data carrier or a copy would be recognizable through incomplete characteristics of the volume hologram and the information missing because of it.

The average roughness is about 5 μm to 25 μm, preferably 10 μm to 15 μm, in an advantageous manner. This creates a wavelength shift of the reconstructed image by at least 20 nm towards shorter wavelengths. The average roughness values stated hereinafter stand for the averaged roughness depth $R_z$ pursuant to the norm DIN-EN ISO 4288, the definition of which is clarified hereinafter. The roughness is measured on a surface for instance by means of a needle which scans the surface and records the path of the needle vertically to the surface and vertically to the layer surface in the present case. The so-called averaged roughness depth is thereby determined while the arithmetic average from five individual roughness depths $R_i$ from five consecutive individual measuring lines on the surface is calculated. The individual roughness depth is hereby the distance between the . . . highest and lowest measured point of the measured section which is scanned with the needle.

$$R_z = \frac{1}{5}\sum_{5}^{i=1} R_i$$

According to a further proposal of the invention, the roughness is stochastically distributed (i.e. the roughness heights and depths are irregularly located on the surface of the layer directly adjacent to the core layer, facing the core layer) by means of irregularly distributed heights and depths. This alone provides a good forgery protection particularly in view of the separation and manipulation tests. The color shift can be very well controlled when the surface of the layer directly adjacent to the core layer is provided with a regular profile. This could for instance be a jagged profile or a profile with rounded edges. Such a profile could be impressed in the surface of the layer directly adjacent to the core layer prior to lamination by means of a micro-forming stamp.

A good scope for design of the data carrier can be attained when the layer directly adjacent to the core layer includes areas with different variations of roughness on the surface facing the core layer prior to lamination. The different areas can thereby take on the shapes of numbers, letters, circles, rectangles or other geometrical shapes, as well as images. The areas can be differentiated in the data carrier by the different wavelength of the holographic image. Additional information can be displayed because of this. The manufacturing process that is connected with such an embodiment contains the additional step that certain areas, which should have a lower roughness than the surrounding areas, are provided with a generally smoothed surface or a regular relief. This can for instance be achieved by means of the forming stamp.

Since polycarbonate (PC) layers have particularly good characteristics with regard to bending strength and deformation, at least one layer adjacent to the core layer is advantageously made out of polycarbonate.

An additional color design can be integrated in the volume hologram when it exhibits local shrinking or swelling.

As a result thereof, the planes of Bragg increase or decrease in size so that the wavelength of the reconstructed image is enlarged or diminished accordingly. A particularly forgery-proof and appealing solution is achieved by the design when the shrinking or swelling includes a gradient towards the surface of the data carrier in an area of the volume hologram. This results in color transitions.

The invention is clarified hereinafter by embodiments which are represented in drawings.

Figure 2:
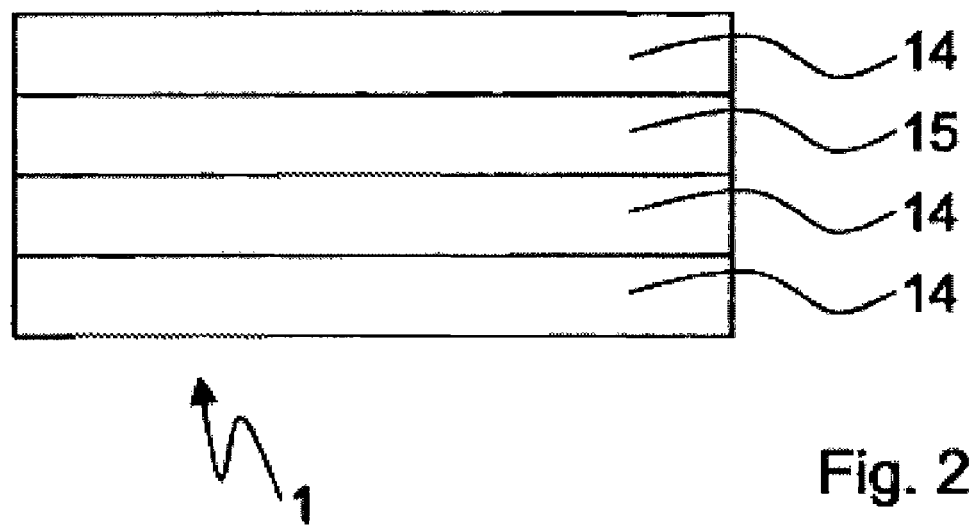
Figure 3:
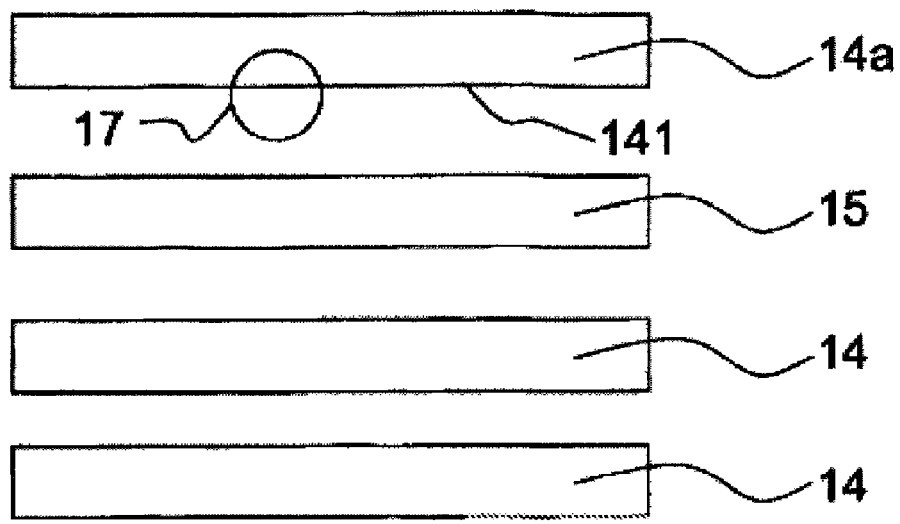
Figure 4:
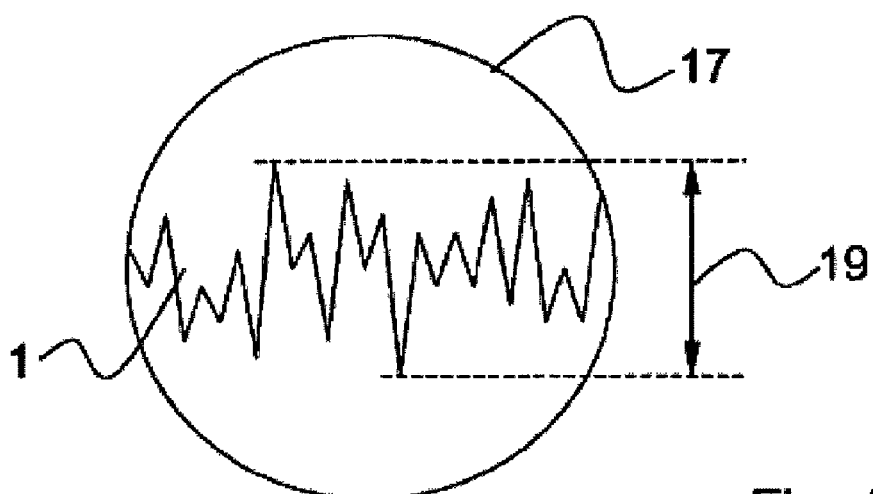
Figure 5:
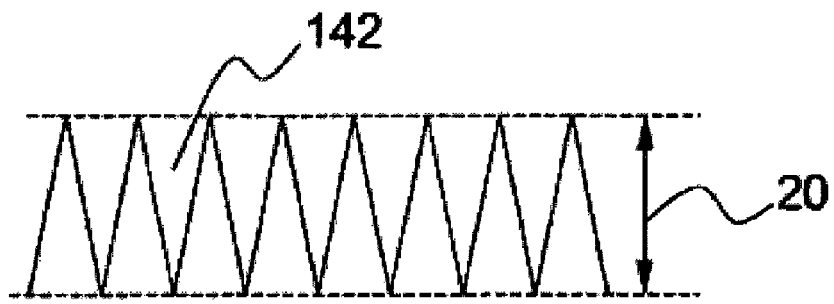
Figure 6:
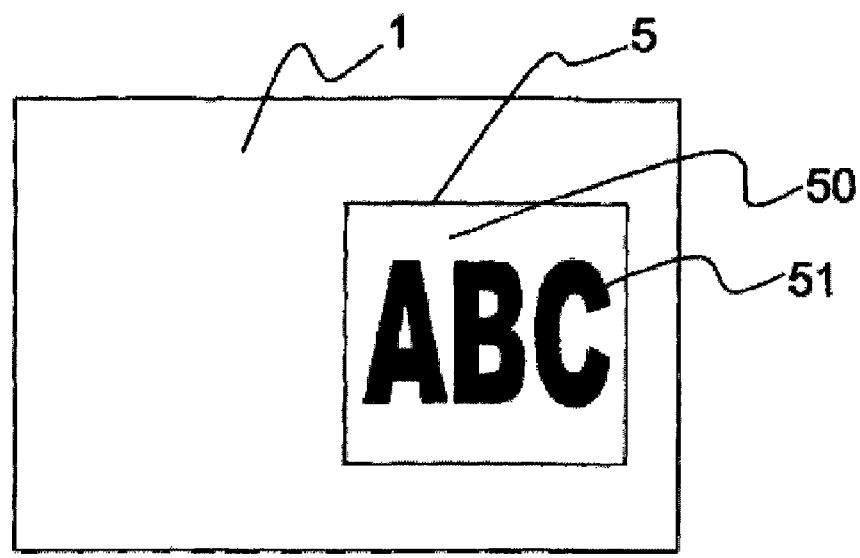
Figure 7:
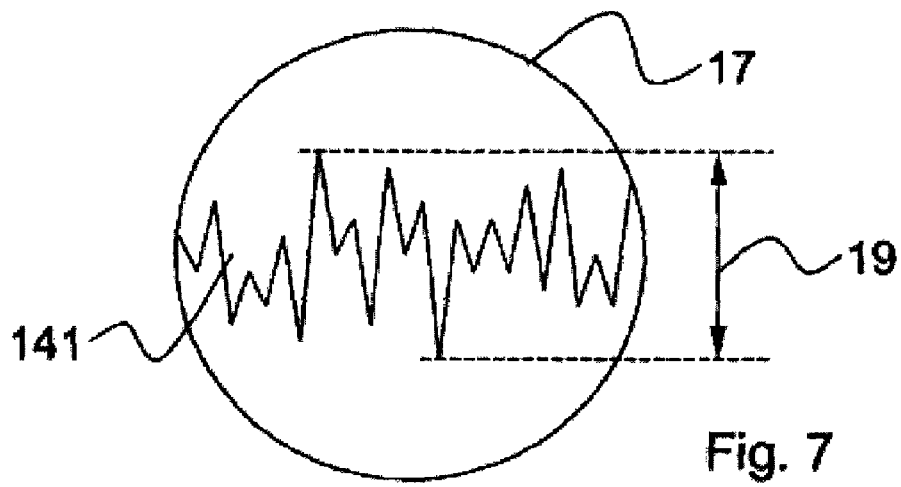
Figure 8:
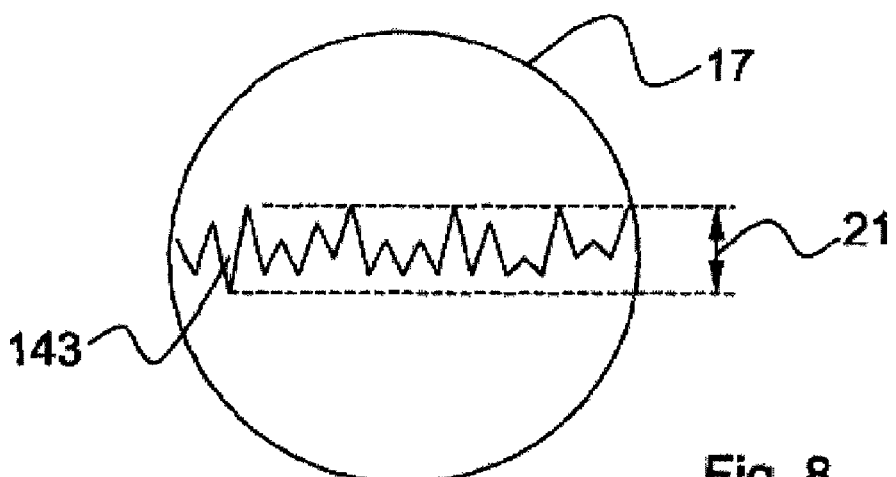

FIG. 1 shows a top view of a data carrier according to the invention,

FIG. 2 shows a cross-sectional view of a data carrier according to the invention, FIG. 3 shows a cross-sectional view of the components of a data carrier according to the invention prior to lamination, FIG. 4 shows a schematic section of the surface, facing the core layer, of the layer directly adjacent to the core layer of the data carrier according to the invention prior to lamination, FIG. 5 shows a schematic section of the surface, facing the core layer, of the layer directly adjacent to the core layer of a further embodiment of a data carrier according to the invention prior to lamination, FIG. 6 shows a top view of a further embodiment of a data carrier according to the invention, and FIGS. 7 and 8 two sections from different areas of the surface, facing the core layer, of the layer directly adjacent to the core layer of this embodiment prior to lamination.

FIG. 1 shows a data carrier 1 according to the invention, having different protective elements. Protective elements are elements that increase the forgery protection of the data carrier.

An image 3 of the data carrier holder and printing data 4 on the data carrier holder are for instance applied to data carrier 1, preferably by means of imprinting or laser inscribing in a laser-active or laser-sensitive layer of the data carrier. The data carrier can comprise additional electronic components such as the RFID-transponder, chip modules or antennas for the dual-interface modules. Additionally, the data carrier includes areas 5 in which a volume hologram element is placed. The areas 5 can partially or in full (holohedrally) stretch across the data carrier. Such volume holograms can reconstruct images, patterns, information comprising letters or numbers, which can be analyzed either visually or by a machine. The visual analysis is done by the human eye which verifies whether the reconstructed images, samples or information corresponds with a predetermined image, sample or information. An automatic verification can be carried out through color control by means of determining the reconstruction wavelength and/or the degree of the diffraction effect. In effect, a statement can be made on the authenticity of the data carrier on the basis of this protective element. The other protective elements can be analyzed on the data carrier either visually or by a machine.

The data carrier that is displayed in FIG. 1 is displayed in a schematic cross-sectional view in FIG. 2. Data carrier 1 includes multiple layers whereby reference sign 14 describes further layers and reference sign 15 indicates a photopolymer film which comprises the volume hologram. Furthermore, this internal layer is also designated as core layer 15. The core layer can also be an intermediate layer. A layer 14 is located above the core layer and two additional layers 14 are located underneath core layer 15 in this embodiment. At least one additional layer or any larger number of additional layers can be placed above and/or underneath core layer 15 in further embodiments. These layers can be composed of polycarbonate (PC) and/or PVC (polyvinylchloride) and/or polyester (e.g. polyethyleneterephtalate (PET)) and/or polyolefin (e.g. polyethylene (PE), polypropylene (PP) and/or ABS (acrylnitril-butadiene-styrene (-copolymer) and/or polyurethane (PU) and/or polyetheretherketone (PEEK) and/or other thermoplastically processible materials or material compounds and/or paper-like materials with at least one plastic laminated layer and/or paper-like materials such as teslin. Multiple core layers 15 can also be placed in the series of layers of the data carrier in a further embodiment.

The layers, including core layer 15, do not need to stretch across the entire width of the data carrier as in the embodiment that is displayed in FIG. 2. They can also just take up parts of the width or length of the data carrier. Core layer 15 consists of a photopolymer film or a silver halogenide film. In addition, the core layer can also comprise other recording materials/media which are common in holography. A selection of such materials are specified in DE 692 01 698 T2 and in "Ullmann's Chemical Encyclopedia", electronic issue of 2003 under the keyword "materials used in holography", which are hereby adopted in the disclosure through quotation.

The layers of the data carrier according to the invention are once again individually placed on top of one another as is evident from the cross-section in FIG. 3 prior to lamination. Photopolymer layer 15 usually includes a layer thickness of at least 5 μm, preferably 5 to 50 μm, most preferably 10 μm to 20 μm. The other layers 14 have a thickness of at least 5 μm, preferably 5 μm to 500 μm, and most preferably 50 μm to 100 μm. Furthermore, the layer, which is adjacent to core layer 15 and positioned on top of it towards the viewer, in the ready-made data carrier designated with reference number 14a in order to better distinguish the other layers. Surface 141, which faces to core layer 15, of layer 14a adjacent to core layer 15 is displayed once again in a cutout 17 in FIG. 4. Surface 141 has a stochastic roughness, i.e. irregularly divided elevations and impressions. Roughness depth 19 for this cutout is also drawn by means of a double arrow. The dotted lines refer hereby to the maximum height and maximum depth of the roughness. The average roughness is equal to 5 µm to 25 µm, preferably 10 µm to 15 µm, in one preferred embodiment. A wavelength shift of the image, which is reconstructed by the volume hologram, of at least 20 nm or smaller wavelengths (blue shift) can be obtained when selecting such a roughness after lamination of the data carrier. The average roughness is thereby proportional to the level of the shift.

In another embodiment for the design of surface 142 of layer 14a adjacent to core layer 15, facing the core layer, is displayed in FIG. 5. This surface 142 includes a regular relief in jagged form, wherein roughness depth 20 arises as distance between the jagged valley and jagged pile in this case. A regular relief can also consist of . . . rounded jags in a further embodiment. Surface 142, which is displayed in FIG. 5, and other surface reliefs can be impressed through micro-impression on surface 142. The average roughness should preferably be within the range of the above-mentioned roughness. The imprinting process must be carried out before compiling the layers prior to lamination.

The components of a data carrier according to the invention, which are displayed in FIG. 3, are—as shown—put together and subsequently connected in the manufacturing process by means of the known lamination process. The known lamination devices include, among other things, roll laminators or thermal transfer presses. The volume hologram is already inserted in the photopolymer layer of core layer 15 according to the known procedure and, if applicable, prepared by removing protective and/or transfer foils prior to compiling the layers. The procedure stated in application DE 198 09 503 A1 can for instance be used for this, which is integrated in the disclosure through quotation. The volume hologram can hereby contain individual data and/or constant data. These individual data can be understood as data which were directly or indirectly allocated to the holder of the data carrier or the data carrier itself and which are individual for this holder. Such individual data can for instance be the image of the data carrier holder or the document number. Constant data, on the other hand, are the same for all holders of the data carrier or for the respective data carrier type. An emblem or an inscription, for example in the form of a country code, can be regarded as constant data. Pressure of a few bar and temperatures of a few 100° C. are applied when laminating to the foil stack. Lamination causes the adjacent areas of the respective foils to soften and enables the fixed retaining of the foils on top of one another after completing the lamination process. In this way, a thermoplastic compound is manufactured. If applicable, an adhesive agent can be applied between the individual foils prior to lamination. However, the adhesive agent can not be inserted between core layer 15 and rough surface 141 of adjacent layer 14a. Only the layers 14a and 15, as well as both layers 14 can for instance be laminated with one another and subsequently both layer compounds in an additional lamination step in further embodiments. It is also possible to provide layer 14a with an imprint, which contains for instance the data of the holder of the data carrier, on the surface facing away from core layer 15 following the lamination of layer 14a and 15.

The layers 14 and 14a can also include imprints prior to lamination. The layers 14 and 14a can also be provided with laser-active or laser-sensitive pigments, which enable the introduction of data and/or images in the layers by means of lasers, in additional embodiments. The laser inscribing causes a color transition of the pigments so that information can be displayed because of it. The laser inscribing of the data carriers can take place prior to lamination and/or between different lamination steps and/or after lamination of the layers.

In another embodiment of the invention is depicted in FIG. 6. Data carrier 1 according to the invention comprises two components in the area of volume hologram 5, a first area 50 and a second area 51, which appear in different colors for the viewer. Area 50 shows for instance a blue color and area 51 shows a red color. Area 51 hereby has the form of letters "ABC" wherein area 51 could also include any other form, e.g. numbers, samples or images. The layer adjacent to the core layer in area 51 is formed in order to smooth out the surface facing the core layer prior to lamination by means of a stamping tool. Consequently, the roughness can be diminished in this area. The difference of the variations of roughness in both areas is schematically displayed in FIGS. 7 and 8. The roughness of surface 141, facing the core layer, of the layer adjacent to the core layer in area 51 prior to lamination is displayed in the section of FIG. 7. A double arrow indicates roughness depth 19 of this section. The average roughness of area 50 corresponds to the average roughness displayed in FIGS. 3 and 4. On the other hand, the section illustrated in FIG. 8 shows the roughness of surface 143, facing the core layer, of the adjacent layer in area 51 prior to lamination. Roughness depth 21 is also indicated as a double arrow and is smaller than roughness depth 19 of area 50 in FIG. 7. Accordingly, the average roughness in area 51 is smaller than the average roughness in area 50. The lower average roughness in area 51 leads to a lesser shift of the planes of Bragg and, consequently, to a lesser sized wavelength shift of the reconstructed image of the volume hologram during the lamination process. In the event that the volume hologram is achieved through coherent radiation in the visible and red wavelength area, the image reconstructed from area 51 still appears red while the image reconstructed from area 50 shifted to a blue color.

Consequently, the viewer can recognize a difference between the images of the volume hologram, which are reconstructed from the areas 50 and 51, in terms of color.

Area 51 can also be provided with a defined, regular imprinting in another embodiment, which has a higher or lower average roughness than area 50. As a result, area 51 either appears to be shifted blue in a stronger way or lesser way than area 50.

The purposeful variation of the lamination temperature over the data carrier surface can result in a purposeful shrinking or swelling of the planes of Bragg of the volume hologram in order to obtain additional color designs. A wavelength gradient can be obtained in an image reconstructed by the volume hologram particularly by means of a temperature gradient towards the data carrier surface. Such a gradient appears as a rainbow-like color shift to the viewer. A continuous color shift of about 300 nm can be realized for instance with a temperature gradient of about 20 K over a path length of 1 cm.

Embodiments of the invention, in which a color shift of the reconstructed image of a volume hologram from an invisible wavelength area to a visible one or from a visible wavelength area to an invisible wavelength area can be realized, is particularly attractive for the forgery protection. The color shift is hereby realized through variations of roughness of the adjacent foil prior to lamination or through shrinking or swelling. When there is sufficiently large roughness of the foil that is placed over the core layer prior to lamination, the wavelength can be shifted from infrared to the visible wavelength area or from the visible wavelength area to the ultraviolet wavelength area. In this way, a volume hologram which is exposed in the visible blue wavelength area after joining it with an adjacent rough layer can for instance only be reconstructed via radiation with ultraviolet rays. The reconstructed image and its characteristics can only be detected by machine. Consequently, hidden and machine-readable information can subsequently be integrated in a volume hologram. The volume hologram is realized in another example through exposure with electromagnetic rays in the infrared wavelength area (e.g. with Nd: YAG-laser at 1064 nm).

The hologram can be reconstructed in the visible wavelength area after lamination with a rough foil, which is placed over the volume hologram, with the stated average roughness.

In another embodiment, layer 14*a*, which is directly adjacent to the core layer, or other layers 14, can be provided with lens structures or other optical active structures.

When the image and/or data, which is contained in the volume hologram of the core layer, is reconstructed through the directly adjacent layer 14*a*, the directly adjacent layer must at least be partially transparent at least for the wavelength area in which the image and/or data are reconstructed. Directly adjacent layer 14*a*, which includes a roughness prior to lamination, can also be placed on the side of core layer 15 in a further embodiment, as a result of which the data and/or images contained in the volume hologram cannot be reconstructed.

It should be understood by one in the art that the described wavelength shifts can be applied to the diffraction of any arrangement.

The invention claimed is:

1. A data carrier comprising,
a holographic data memory consisting of a core layer, said core layer containing regions of different refractive index from which a holographic image may be reconstructed by exposure to incident light; and
an adjacent layer laminated to said core layer, said adjacent layer having an inner surface facing said core layer, said inner surface having an average roughness before lamination to the core layer of about 5 μm to 25 μm so as to result in a wavelength shift of the holographic image reconstructed from said core layer of about 20 nm.

2. The data carrier according to claim 1, wherein the inner surface has a stochastically distributed roughness.

3. The data carrier according to claim 1, wherein the inner surface has a roughness profile having a regular jagged relief.

4. The data carrier according to claim 1, wherein the adjacent layer includes a first area having a first roughness profile and a second area having a second roughness profile, wherein the first roughness profile is different from the second roughness profile.

5. The data carrier according to claim 4, wherein the first and second areas display information in the form of numbers, letters, geometric forms or images.

6. The data carrier according to claim 1, wherein the adjacent layer comprises at least one processible thermoplastic material.

7. The data carrier according to claim 6, wherein the processible thermoplastic material includes polycarbonate (PC).

8. The data carrier according to claim 1, wherein the adjacent layer comprises a paper-like material having at least one plastic laminated layer.

9. The data carrier according to claim 1, wherein the adjacent layer is imprinted.

10. The data carrier according to claim 1, wherein the holographic data memory includes at least one area that is locally shrunken or swollen.

11. The data carrier according to claim 10, wherein said at least one area that is shrunken or swollen is subjected to a temperature gradient towards a data carrier surface.

12. The data carrier according to claim 1, wherein an increased roughness of said adjacent layer corresponds to an increased shift of the wavelength of the holographic image to shorter wavelengths.

13. A method of manufacturing a data carrier with a holographic data memory, said method comprising the steps of:
a) providing a holographic data memory consisting of a core layer, said core layer containing regions of different refractive index from which a holographic image may be reconstructed by exposure to incident light, said core layer having a first surface;
b) providing an adjacent layer having an adjacent surface with a roughness; and
c) then laminating the adjacent layer to the core layer so that the adjacent surface of the adjacent layer is in contact with the first surface of the core layer;
wherein the adjacent surface of the adjacent layer has an average roughness of about 5 μm to 25 μm so as to produce a wavelength shift of the holographic image reconstructed from said core layer of at least 20 nm.

14. The method according to claim 13, wherein a regular relief is impressed onto a selected area of the adjacent surface through at least one of thermal and mechanical deformation.

15. The method according to claim 14, wherein the selected area corresponds to at least one of a geometric form, a number, a letter, and an image.

16. A data carrier comprising:
a holographic data memory consisting of a core layer of light-sensitive material in which regions of different refractive index are inserted by exposure to coherent radiation of a certain wavelength so that a holographic image may be reconstructed by refraction of incident light at said regions and interference within reflected light; and
an adjacent layer laminated to said core layer whose inner surface facing said core layer has a regular or irregular roughness a pattern so as to shift the wavelength of said holographic image reconstructed from said core layer by said incident light;
wherein said inner surface has an average roughness before lamination to the core layer of about 5 μm to 25 μm so as to result in a wavelength shift of the holographic image reconstructed from said core layer of about 20 nm.

17. The data carrier according to claim 16, wherein the adjacent layer includes a first area having a first roughness profile and a second area having a second roughness profile, wherein the first roughness profile is different from the second roughness profile, and wherein the first and second areas display information in the form of numbers, letters, geometric forms or images.

18. The data carrier according to claim 16, wherein the adjacent layer comprises at least one thermoplastic material.

19. The data carrier according to claim 18, wherein the at least one thermoplastic material comprises polycarbonate.

20. A method of manufacturing a data carrier comprising the steps of:
a) providing a holographic data memory consisting of a core layer of light sensitive material in which regions of different refractive index have been inserted by exposure to coherent radiation of a certain wavelength so that a holographic image may be reconstructed by refraction of incident light at said regions and interference within reflected light;

b) providing an adjacent layer having an adjacent surface provided with a regular or irregular roughness; and c) laminating said adjacent layer and said core layer so that said adjacent surface of said adjacent layer is firmly connected with a first surface of said core layer;

wherein a wavelength shift of said holographic image reconstructed from said holographic data memory by exposure to the incident light is observed; and wherein the adjacent surface has an average roughness of about 5 µm to 25 µm so that said wavelength shift of said holographic image reconstructed from said core layer is about 20 nm.

21. The method according to claim 20, further comprising increasing said roughness of said adjacent layer so as to increase said wavelength shift of said holographic image to shorter wavelengths.

22. The method according to claim 20, wherein a regular relief is impressed onto a selected area of said adjacent layer through at least one of thermal and mechanical deformation.

* * * * *